United States Patent
Furuya et al.

(10) Patent No.: US 7,727,635 B2
(45) Date of Patent: Jun. 1, 2010

(54) ABRASION-RESISTANT COATING COMPOSITION AND COATED ARTICLE

(75) Inventors: Masahiro Furuya, Takasaki (JP); Muneo Kudo, Annaka (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 23 days.

(21) Appl. No.: 12/127,331

(22) Filed: May 27, 2008

(65) Prior Publication Data

US 2008/0299400 A1    Dec. 4, 2008

(30) Foreign Application Priority Data

May 28, 2007    (JP)    ............... 2007-140729

(51) Int. Cl.
*B32B 9/04* (2006.01)
*C08K 3/34* (2006.01)
*C08L 83/04* (2006.01)

(52) U.S. Cl. .................. 428/447; 428/331; 524/493; 524/859; 524/861; 524/863

(58) Field of Classification Search ................ 428/447, 428/331; 524/493, 859, 861, 863
See application file for complete search history.

(56) References Cited

U.S. PATENT DOCUMENTS 6,399,211 B2 * 6/2002 Lewis .......................... 428/447

| | | | |
|---|---|---|---|
| 6,521,290 B1 | 2/2003 | Kudo et al. | 427/214 |
| 2005/0244659 A1 | 11/2005 | Higuchi et al. | 428/447 |
| 2006/0083936 A1 | 4/2006 | Higuchi et al. | 428/447 |
| 2006/0171872 A1 | 8/2006 | Adams | 423/335 |
| 2007/0110906 A1 | 5/2007 | Edelmann et al. | 427/387 |

FOREIGN PATENT DOCUMENTS

| | | |
|---|---|---|
| DE | 10 2005 052 938 A1 | 5/2007 |
| DE | 10 2006 027 480 A1 | 1/2008 |
| EP | 1 657 283 A1 | 5/2006 |
| EP | 1 741 672 A1 | 1/2007 |
| GB | 1 454 960 | 11/1976 |
| GB | 2 001 870 A | 2/1979 |
| GB | 1 596 151 | 8/1981 |
| JP | 63-168470 | 7/1988 |
| JP | 2006-232870 | 9/2006 |
| WO | WO 2007/144235 A2 | 12/2007 |

* cited by examiner

*Primary Examiner*—D. S Nakarani
(74) *Attorney, Agent, or Firm*—Oblon, Spivak, McClelland, Maier & Neustadt, L.L.P.

(57) ABSTRACT

A coating composition that is capable of forming a coating film that combines abrasion resistance and crack resistance. The composition comprises: (A) a silicone resin obtained by hydrolysis and condensation of an alkoxysilane that includes an alkoxysilane represented by a general formula (1):

$$(R^1)_m Si(OR^2)_{4-m} \qquad (1)$$

(wherein, $R^1$ represents a hydrogen atom, or a substituted or unsubstituted monovalent hydrocarbon group, $R^2$ represents an alkyl group of 1 to 3 carbon atoms, and m represents either 0 or 1), (B) hydrophobic silica microparticles, (C) a curing catalyst, and (D) a solvent.

10 Claims, No Drawings

ABRASION-RESISTANT COATING COMPOSITION AND COATED ARTICLE

BACKGROUND OF THE INVENTION

1. Field of the Invention

The present invention relates to a coating composition capable of forming a hard coating film that combines abrasion resistance and crack resistance, as well as a coated article that uses this composition.

2. Description of the Prior Art

Examples of known coating compositions used for forming surface-protective coatings on the surfaces of organic resin substrates such as plastics with the aim of imparting superior levels of hardness and abrasion resistance include compositions obtained by hydrolysis or partial hydrolysis of a hydrolyzable organosilane, and compositions obtained by mixing such a composition with a colloidal silica.

For example, patent reference 1, patent reference 2, patent reference 3 and patent reference 4 disclose coating agents composed of an organoalkoxysilane, a hydrolysis product of the organoalkoxysilane and/or a partial condensation product thereof, and a colloidal silica, wherein the alkoxy groups are converted to silanol groups in an excess of water. However, although the coating films obtained from these coating agents exhibit a high degree of hardness, favorable weather resistance and excellent substrate protection, they lack toughness. For example, if a coating film with a thickness of 10 μm or greater is removed from the curing oven during heat-curing, and subsequently used outdoors, then the coating film is prone to cracking upon rapid variations in temperature. Furthermore, even though a buffered basic catalyst is used as the curing catalyst in order to ensure more favorable storage stability, because the hydrolysis/condensation product of the alkoxysilane within these coating compositions is composed mainly of comparatively low molecular weight substances, and because the reactivity of the silanol groups incorporated within these comparatively low molecular weight substances is extremely high, and the silanol content is high, these low molecular weight substances undergo gradual condensation even at room temperature, causing an increase over time in the molecular weight that leads to a decrease in the coating hardness. Gelling of the coating may also occur in some cases, and these problems of stability mean practical application of these coating agents is impossible.

In order to address these problems, patent reference 5 proposes a composition which, by using a specific basic compound as a curing catalyst, combines favorable storage stability for the liquid, with superior levels of crack resistance, hardness and abrasion resistance for the coating film. Moreover, in patent reference 6, by including a component for imparting flexibility as an essential component, and setting the weight average molecular weight for the organosiloxane resin to a comparatively high value of 1,500 or greater, a combination of abrasion resistance and crack resistance can be achieved to some extent, although the composition is unable to prevent the occurrence of micro cracks in an extended weather resistance test, meaning the durability is not entirely satisfactory.

[Patent Reference 1] GB 1454960 A
[Patent Reference 2] GB 1596151 A
[Patent Reference 3] GB 2001870 A
[Patent Reference 4] JP 63-168470 A
[Patent Reference 5] US 2005/0244659 A1
[Patent Reference 6] US 2006/0083936 A1

SUMMARY OF THE INVENTION

An object of the present invention is to provide a coating composition that is capable of forming a coating film that combines abrasion resistance and crack resistance.

The inventors of the present invention discovered that by replacing the type of colloidal silica used in conventional hard coating compositions with a specific hydrophobic silica microparticles that have been subjected to a hydrophobic surface treatment, both the abrasion resistance and the crack resistance could be improved dramatically.

In other words, in order to achieve the object described above, the present invention provides an abrasion-resistant coating composition comprising:

(A) a silicone resin obtained by hydrolysis and condensation of at least one compound selected from the group consisting of alkoxysilanes represented by a general formula (1) shown below and partial hydrolysis-condensation products thereof:

$$(R^1)_m Si(OR^2)_{4-m} \qquad (1)$$

(wherein, $R^1$ represents a hydrogen atom, or a substituted or unsubstituted monovalent hydrocarbon group, $R^2$ represents an alkyl group of 1 to 3 carbon atoms, and m represents either 0 or 1), or a silicone resin obtained by hydrolysis and condensation of at least one material selected from the group consisting of combinations of an alkoxysilane represented by the above general formula (1) and a dialkoxysilane represented by a general formula (2) shown below:

$$(R^1)_2 Si(OR^2)_2 \qquad (2)$$

(wherein, $R^1$ and $R^2$ are as defined above), and partial hydrolysis-condensation products of the combinations, (B) hydrophobic silica microparticles,
(C) a curing catalyst, and
(D) a solvent.

Furthermore, the present invention also provides a coated item comprising a substrate, and a cured coating film of the above coating composition that is formed on a portion of the substrate surface, either directly or with one or more other layers disposed therebetween.

The present invention yields the following effects.

(I) By including an organosiloxane resin containing condensation-curable silanol groups as a binder, as well as hydrophobic silica microparticles in which the surface has been coated with trialkylsilyl groups, the coating composition of the present invention is able to provide both abrasion resistance and crack resistance. It is thought that the mechanism described below is responsible for this phenomenon.

In a coating film formed from the composition of the present invention, a portion of the microparticles of the component (B) are exposed at the coating film surface, and the presence of microscopic unevenness at the coating film surface can be confirmed by analysis of the surface using an atomic force microscope (AFM). It is thought that this surface unevenness reduces the contact surface area of the film surface, thereby making the surface more slippery, and therefore less prone to scratching. On the other hand, it is surmised that the quantity of functional groups at the surface of the microparticles that are capable of forming chemical bonds with the matrix resin, specifically silanol groups and alkoxysilyl groups, is markedly lower than that observed for a conventional colloidal silica, and as a result, the degree of crosslinking within the film is reduced, thereby reducing the likelihood of micro cracks occurring during weather resistance tests. In all conventional systems to date, reducing the degree of cross-linking has caused a reduction in the abrasion resistance, but in the system of the present invention, because the aforementioned microscopic unevenness imparts favorable abrasion resistance, a combination of favorable crack resistance and favorable abrasion resistance has been achieved for the first time.

(II) In a coated article of the present invention, because the silica microparticles are scattered across the surface of the coating film, the concentration of hydrophobic particles at the interface with the substrate is quite small. It is thought that silanol groups within the matrix binder resin play an important role in the interface adhesion between the substrate or the primer layer formed on the substrate, and the generated coating film layer, and in a coated article of the present invention, a structure in which the concentration of silica microparticles is graduated through the thickness direction of the coating film is preferred in terms of the interface adhesion.

DETAILED DESCRIPTION OF THE PREFERRED EMBODIMENTS

A more detailed description of the composition of the present invention is provided below.

[Component (A)]

The component (A) used in the present invention is a binder component that is essential for achieving the desired abrasion resistance for the coating film, and is a component that undergoes a condensation reaction upon heat curing, thereby forming cross-linked structures within the film interior.

In other words, the component (A) is a silicone resin obtained by hydrolysis and condensation of at least one compound selected from the group consisting of alkoxysilanes represented by a general formula (1) shown below and partial hydrolysis-condensation products thereof:

$$(R^1)_m Si(OR^2)_{4-m} \quad (1)$$

(wherein, $R^1$ represents a hydrogen atom, or a substituted or unsubstituted monovalent hydrocarbon group, $R^2$ represents an alkyl group of 1 to 3 carbon atoms, and m represents either 0 or 1), or a silicone resin obtained by hydrolysis and condensation of at least one material selected from the group consisting of combinations of an alkoxysilane represented by the above general formula (1) and a dialkoxysilane represented by a general formula (2) shown below:

$$(R^1)_2 Si(OR^2)_2 \quad (2)$$

(wherein, $R^1$ and $R^2$ are as defined above), and partial hydrolysis-condensation products of the combinations.

In the general formula (1), $R^1$ represents a hydrogen atom, or a substituted or unsubstituted monovalent hydrocarbon group. Specific examples include a hydrogen atom; alkyl groups such as a methyl group, ethyl group, propyl group, butyl group, pentyl group, hexyl group, heptyl group or octyl group; cycloalkyl groups such as a cyclopentyl group or cyclohexyl group; alkenyl groups such as a vinyl group or allyl group; aryl groups such as a phenyl group; halogen-substituted hydrocarbon group such as a chloromethyl group, γ-chloropropyl group or 3,3,3-trifluoropropyl group; and hydrocarbon groups substituted with a (meth)acryloyloxy group, epoxy group-containing group, mercapto group or amino group, such as a γ-methacryloyloxypropyl group, γ-glycidoxypropyl group, 3,4-epoxycyclohexylethyl group, γ-mercaptopropyl group or γ-aminopropyl group. Of these, an alkyl group, and particularly a methyl group, is preferred in those cases where particularly favorable levels of abrasion resistance and weather resistance are required.

Furthermore, $R^2$ represents an alkyl group of 1 to 3 carbon atoms, and examples include a methyl group, ethyl group, n-propyl group or i-propyl group. Of these, in terms of achieving a high hydrolysis-condensation reactivity, and achieving a high vapor pressure for the produced alcohol ($R^2OH$) in order to facilitate its removal by evaporation, a methyl group or ethyl group is preferred.

Examples of the alkoxysilane represented by the general formula (1) and partial hydrolysis-condensation products thereof include the compounds (a-1) and (a-2) described below.

—Compound (a-1): Compounds in which m=0 in the General Formula (1)

These compounds (a-1) include tetraalkoxysilanes represented by the general formula $Si(OR^2)_4$ and partial hydrolysis-condensation products thereof. Specific examples of these tetraalkoxysilanes and partial hydrolysis-condensation products thereof include tetramethoxysilane, tetraethoxysilane, tetraisopropoxysilane, tetrabutoxysilane, partial hydrolysis-condensation products of tetramethoxysilane (such as the product "M Silicate 51" manufactured by Tama Chemicals Co., Ltd., the product "MSI51" manufactured by Colcoat Co., Ltd., and the products "MS51" and "MS56" manufactured by Mitsubishi Chemical Corporation), partial hydrolysis-condensation products of tetraethoxysilane (such as the products "Silicate 35" and "Silicate 45" manufactured by Tama Chemicals Co., Ltd., and the products "ESI40" and "ESI48" manufactured by Colcoat Co., Ltd.), and co-hydrolysis-condensation products of tetramethoxysilane and tetraethoxysilane (such as the product "FR-3" manufactured by Tama Chemicals Co., Ltd., and the product "EMSi48" manufactured by Colcoat Co., Ltd.).

Compound (a-2): Compounds in which m=1 in the General Formula (1)

These compounds (a-2) include trialkoxysilanes represented by the general formula $R^1Si(OR^2)_3$ and partial hydrolysis-condensation products thereof. Specific examples of these trialkoxysilanes and partial hydrolysis-condensation products thereof include hydrogentrimethoxysilane, hydrogentriethoxysilane, methyltrimethoxysilane, methyltriethoxysilane, methyltriisopropoxysilane, ethyltrimethoxysilane, ethyltriethoxysilane, ethyltriisopropoxysilane, propyltrimethoxysilane, propyltriethoxysilane, propyltriisopropoxysilane, phenyltrimethoxysilane, vinyltrimethoxysilane, allyltrimethoxysilane, γ-methacryloyloxypropyltrimethoxysilane, γ-methacryloyloxypropyltriethoxysilane, γ-acryloyloxypropyltrimethoxysilane, γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane, partial hydrolysis-condensation products of methyltrimethoxysilane (such as the products "KC-89S" and "X-40-9220" manufactured by Shin-Etsu Chemical Co., Ltd.), and partial hydrolysis-condensation products of methyltrimethoxysilane and γ-glycidoxypropyltrimethoxysilane (such as the product "X-41-1056" manufactured by Shin-Etsu Chemical Co., Ltd.).

The dialkoxysilanes represented by the general formula (2) and the partial hydrolysis-condensation products thereof (the compound (a-3)) can only be used in combination with an alkoxysilane represented by the general formula (1) and/or a partial hydrolysis-condensation product thereof.

Compound (a-3): Specific examples of the dialkoxysilanes represented by the general formula (2) and partial hydrolysis-condensation products thereof include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, vinylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, γ-methacryloyloxypropylmethyldimethoxysilane, γ-methacryloyloxypropylmethyldiethoxysilane, γ-mercaptopropylmethyldimethoxysilane, γ-aminopropylmethyldiethoxysilane, and N-(2-aminoethyl)aminopropylmethyldimethoxysilane.

The silicone resin of the component (A) can be prepared by mixing each of the various alkoxysilanes in an arbitrary ratio, including at least one compound selected from the above compounds (a-1) and (a-2), and where necessary a compound (a-3), and then subjecting the mixture to hydrolysis and condensation. In order to improve the storage stability of the composition, and improve the abrasion resistance and crack resistance of the resulting coating film, the respective quantities of the various compounds, relative to a combined 100 Si mol % represented by the combination of the compounds (a-1), (a-2) and (a-3), are preferably from 0 to 50 Si mol % for the compound (a-1), from 50 to 100 Si mol % for the compound (a-2), and from 0 to 10 Si mol % for the compound (a-3). If the proportion of the compound (a-2), which is the essential component in this preferred example, is less than 50 Si mol %, then the cross-linking density within the resin decreases, which tends to cause weaker curability and a lower degree of hardness for the resulting cured coating film. If the compound (a-1) is used in a quantity exceeding 50 Si mol % then the cross-linking density within the cured coating film becomes overly high, which tends to cause a decrease in the film toughness, making preventing cracks more difficult. Particularly preferred quantities are from 0 to 40 Si mol % for the compound (a-1), from 60 to 100 Si mol % for the compound (a-2), and from 0 to 5 Si mol % for the compound (a-3).

In this description, the units "Si mol %" represent the mol % for each compound calculated in terms of the number of Si atoms.

In one example of a method of producing the silicone resin, a single alkoxysilane represented by the general formula (1) or a partial hydrolysis-condensation product thereof, or a mixture of two or more such compounds, is subjected to hydrolysis under conditions including a pH within a range from 1 to 7.5, and preferably from 2 to 7. In order to adjust the pH to a value within this range, thereby accelerating the hydrolysis, an organic acid or inorganic acid such as hydrofluoric acid, hydrochloric acid, nitric acid, formic acid, acetic acid, propionic acid, oxalic acid, citric acid, maleic acid, benzoic acid, malonic acid, glutaric acid, glycolic acid, methanesulfonic acid or toluenesulfonic acid, or a solid acid catalyst such as a cation exchange resin having carboxylic acid groups or sulfonic acid groups at the surface may be used as a catalyst.

In the hydrolysis, the quantity of water used should be set within a range from 50 to 3,000 parts by mass of water per 100 parts by mass of the above combination of the alkoxysilanes and/or partial hydrolysis-condensation products thereof. If the quantity of water is too low, then the polystyrene-referenced weight average molecular weight of the resulting silicone resin, as determined by gel permeation chromatography (GPC) analysis, does not reach the ideal range described below. If the water quantity is too large, then although the hydrolysis proceeds rapidly, a large excess of water remains, causing a reduction in the pot yield.

The water content within the composition is preferably not more than 10% by mass. This moisture is required to maintain the dispersion stability of the hydrophobic silica microparticles of the component (B). Accordingly, either the quantity of water added to effect the hydrolysis of the component (A) must be set so that the residual quantity of water, following consumption of the majority of the water by the hydrolysis reaction, is not more than 10% by mass, or excess water must be separated from a resin solution layer containing a water-insoluble solvent.

The hydrolysis may be conducted by dripping or pouring the water into the above alkoxysilane and/or partial hydrolysis-condensation product thereof, or alternatively, by dripping or pouring the alkoxysilane and/or partial hydrolysis-condensation product thereof into water.

In order to obtain the silicone resin of the component (A), a condensation must be conducted following the above hydrolysis. The condensation may be conducted in a continuous manner after the hydrolysis, and is typically conducted either with the liquid temperature at room temperature, or under heating at a temperature of not more than 100° C. At temperatures exceeding 100° C., gelling may occur. The condensation reaction can be accelerated by removing the alcohol generated by the hydrolysis reaction, by evaporation at 80° C. or higher at either normal pressure or under reduced pressure. Moreover, a condensation catalyst such as a basic compound, acidic compound or metal chelate compound may also be added to accelerate the condensation. An organic solvent may also be added, either prior, to or during the condensation process, with the aim of regulating the progression of the condensation reaction and the concentration of the reaction system. Generally, the silicone resin increases in molecular weight as the condensation progresses, causing a deterioration in the resin solubility within water or the generated alcohol, and consequently the added organic solvent is preferably an organic solvent of comparatively high polarity that readily dissolves the silicone resin and has a boiling point of at least 80° C. Specific examples of this type of organic solvent include alcohols such as isopropyl alcohol, n-butanol, isobutanol, t-butanol and diacetone alcohol; ketones such as methyl propyl ketone, diethyl ketone, methyl isobutyl ketone, and cyclohexanone; ethers such as dipropyl ether, dibutyl ether, anisole, dioxane, ethylene glycol monoethyl ether, ethylene glycol monobutyl ether, propylene glycol monomethyl ether and propylene glycol monomethyl ether acetate; and esters including aliphatic acid esters such as propyl acetate, butyl acetate and cyclohexyl acetate.

In order to remove the excess water that was added to conduct the hydrolysis, the produced silicone resin may be dissolved in an organic solvent that is essentially insoluble in water, and the organic layer then separated from the water layer. Preferred examples of this type of solvent include methyl isobutyl ketone and cyclohexanone.

One example of a method of producing the above type of silicone resin is the organopolysiloxane production method described in Japanese Patent Publication No. 3,703,116.

From the viewpoints of the toughness, crack resistance and hardness of the resulting coating film, the polystyrene-referenced weight average molecular weight of the silicone resin of the component (A), determined by GPC analysis, is preferably at least 2,000 but not more than 50,000, and is even more preferably within a range from 2,500 to 20,000. If the molecular weight is too low, then the toughness of the coating film deteriorates, making the film more prone to cracking, whereas if the molecular weight is too high, then the hardness of the film tends to decrease.

[Component (B)]

The component (B) is silica microparticles that have been subjected to a hydrophobic surface treatment. The degree of hydrophobization, specified by the dispersibility of the particles within a water-methanol system, can be used as a measure of the hydrophobicity. One example of a method of measuring this value is described below. If 0.2 g of silica microparticles are added to 50 ml of water and stirred, then in those cases where the surface of the silica microparticles is hydrophobic, the particles do not disperse in the water, but rather float on the water surface. Methanol is then added dropwise to the system from a burette under constant stirring, and the point at which the entire quantity of silica microparticles is wetted completely and disperses within the liquid is deemed the end point. The methanol percentage within the water-methanol mixed system obtained at the end point is used as an indicator of the degree of hydrophobization. Hydrophobic silica microparticles that are ideal as the component (B) have a degree of hydrophobization that is preferably within a range from 20 to 95, and even more preferably from 40 to 80. If this degree of hydrophobization is less than 20, then the microparticles are similar to typical colloidal silica, with a large quantity of silanol groups at the surface of the microparticles, and as a result, the crack resistance achieved is unsatisfactory. If the degree of hydrophobization is 95 or greater, then the hydrophobicity is overly strong, and the dispersibility of the microparticles within polar solvents such as alcohols may be too low.

Furthermore, the component (B) preferably exhibits extremely minimal aggregation of the silica microparticles, disperses readily in polar solvents, produces a semi-transparent external appearance, and is able to be filtered using a filter, filter paper or filter plate or the like. Specifically, in a dispersion prepared by dispersing the silica microparticles in an organic solvent such as an alcohol, the lower limit for the 50% volume average particle size (D50) of the dispersed particles is preferably not less than 30 nm, and is even more preferably 40 nm or greater. The upper limit for the D50 value is preferably not more than 1,000 nm, even more preferably not more than 500 nm, and is most preferably 300 nm or less. If D50 is too small, then the abrasion resistance of the obtained coating film deteriorates, whereas if D50 is too large, other problems arise, including a deterioration in the transparency of the obtained coating film, and an unsatisfactory external appearance due to the very large size of the particles. The D50 value can be measured using a measurement apparatus that employs a light scattering method, such as a "Nanotrac UPA-EXI150" (a product name, manufactured by Nikkiso Co., Ltd.), or a "LA-910" (a product name, manufactured by Horiba, Ltd.).

Hydrophobic silica microparticles produced using a production method that includes the steps described below are preferred as the component (B).

(I) A Step of Subjecting a Tetrafunctional Silane Compound Represented By $Si(OR^4)_4$ (wherein, $R^4$ represents identical or different monovalent hydrocarbon groups of 1 to 6 carbon atoms) or a partial hydrolysis-condensation product thereof, or a mixture thereof, to hydrolysis and condensation within a mixed liquid of a hydrophilic organic solvent and water that contains a basic substance, thereby forming a silica microparticles dispersion.

(II) A Step of Adding a Trifunctional Silane Compound Represented by a General Formula (3):

$$R^5Si(OR^6)_3 \qquad (3)$$

(wherein, $R^5$ represents a substituted or unsubstituted hydrocarbon group of 1 to 20 carbon atoms, and $R^6$ represents identical or different monovalent hydrocarbon groups of 1 to 6 carbon atoms) or a partial hydrolysis-condensation product thereof, or a mixture thereof, to the prepared silica microparticles dispersion, thereby treating the surface of the silica microparticles, introducing $R^5SiO_{3/2}$ units at the surface of the silica microparticles, and yielding a treated silica dispersion.

(III) A Step of Adding a Silazane Compound Represented by a General Formula (4):

$$(R^3)_3SiNHSi(R^3)_3 \qquad (4)$$

or a monofunctional silane compound represented by a general formula (5):

$$(R^3)_3SiX \qquad (5)$$

(wherein, X represents an OH group or a hydrolyzable group), or a mixture thereof, to the treated silica dispersion, thereby treating the surface of the silica microparticles, and introducing $(R^3)_3SiO_{1/2}$ units at the surface of the silica microparticles.

In the step of (I), in the tetrafunctional silane compound represented by $Si(OR^4)_4$, $R^4$ is preferably a monovalent hydrocarbon group of 1 to 4 carbon atoms, and even more preferably a monovalent hydrocarbon of 1 to 2 carbon atoms. Examples of the monovalent hydrocarbon group represented by $R^4$ include a methyl group, ethyl group, propyl group, butyl group and phenyl group, preferred examples include a methyl group, ethyl group, propyl group and butyl group, and particularly preferred examples include a methyl group and ethyl group.

Examples of the tetrafunctional silane compound include tetraalkoxysilanes such as tetramethoxysilane, tetraethoxysilane, tetrapropoxysilane and tetrabutoxysilane, as well as tetraphenoxysilane, preferred examples include tetramethoxysilane, tetraethoxysilane, tetrapropoxysilane and tetrabutoxysilane, and particularly preferred examples include tetramethoxysilane and tetraethoxysilane. Furthermore, examples of partial hydrolysis-condensation products of the tetrafunctional silane compound include methyl silicate and ethyl silicate.

There are no particular restrictions on the hydrophilic organic solvent, provided it is capable of dissolving the tetrafunctional silane compound, partial hydrolysis-condensation products thereof, and water, and examples include alcohols, cellosolves such as methyl cellosolve, ethyl cellosolve, butyl cellosolve and cellosolve acetate, ketones such as acetone and methyl ethyl ketone, and ethers such as dioxane and tetrahydrofuran, and of these, alcohols and cellosolves are preferred, and alcohols are particularly desirable. These alcohols include compounds represented by the general formula shown below:

$$ROH$$

[wherein, R represents a monovalent hydrocarbon group of 1 to 6 carbon atoms]

In the above general formula, R is preferably a monovalent hydrocarbon group of 1 to 4 carbon atoms, and even more preferably a monovalent hydrocarbon group of 1 to 2 carbon atoms. Examples of the monovalent hydrocarbon group represented by R include alkyl groups such as a methyl group, ethyl group, propyl group, isopropyl group and butyl group, preferred examples include a methyl group, ethyl group, propyl group and isopropyl group, and particularly preferred examples include a methyl group and ethyl group. Examples of the alcohol represented by the general formula include methanol, ethanol, propanol, isopropanol and butanol, and preferred examples include methanol and ethanol.

Examples of the above basic substance include ammonia, dimethylamine and diethylamine, and of these, ammonia and diethylamine are preferred, and ammonia is particularly desirable. A predetermined quantity of the basic substance is typically dissolved in water, and the resulting (basic) aqueous solution is then mixed with the above hydrophilic organic solvent.

The quantity of water used at this point is preferably within a range from 0.5 to 5 mols, even more preferably from 0.6 to 2 mols, and most preferably from 0.7 to 1 mols, per 1 mol of the total quantity of hydrocarbyloxy groups within the tetrafunctional silane compound and/or the partial hydrolysis-condensation product thereof. The ratio of the hydrophilic organic solvent relative to the water, reported as a mass ratio, is preferably within a range from 0.5 to 10, even more preferably from 3 to 9, and is most preferably from 5 to 8. The greater the quantity of the hydrophilic organic solvent, the smaller the particle size of the silica microparticles becomes. The quantity of the basic substance is preferably within a range from 0.01 to 2 mols, even more preferably from 0.02 to 5 mols, and most preferably from 0.04 to 0.12 mols, per 1 mol of the total quantity of hydrocarbyloxy groups within the tetrafunctional silane compound and/or the partial hydrolysis-condensation product thereof. The smaller the quantity of the basic substance, the smaller the particle size of the silica microparticles becomes.

The hydrolysis and condensation of the tetrafunctional silane compound can be conducted using known methods, namely, by adding the tetrafunctional silane compound to a mixture of the hydrophilic organic solvent and water containing the basic substance.

The concentration of the silica microparticles within the mixed solvent dispersion of hydrophilic spherical silica microparticles obtained in this step (I) is typically within a range from 3 to 15% by mass, and is preferably from 5 to 10% by mass.

Next, in regard to the step (3), in the above general formula (II), $R^5$ is preferably a monovalent hydrocarbon group of 1 to 3 carbon atoms, and even more preferably a monovalent hydrocarbon group of 1 to 2 carbon atoms. Examples of the monovalent hydrocarbon group represented by $R^5$ include alkyl groups such as a methyl group, ethyl group, n-propyl group, isopropyl group, butyl group and hexyl group, preferred examples include a methyl group, ethyl group, n-propyl group and isopropyl group, and particularly preferred examples include a methyl group and ethyl group. A portion of, or all of, the hydrogen atoms within these monovalent hydrocarbon groups may be substituted with a halogen atom such as a fluorine atom, chlorine atom or bromine atom, and preferably with a fluorine atom.

In the general formula (3), $R^6$ is preferably a monovalent hydrocarbon group of 1 to 3 carbon atoms, and even more preferably a monovalent hydrocarbon group of 1 to 2 carbon atoms. Examples of the monovalent hydrocarbon group represented by $R^6$ include alkyl groups such as a methyl group, ethyl group, propyl group and butyl group, preferred examples include a methyl group, ethyl group and propyl group, and particularly preferred examples include a methyl group and ethyl group.

Examples of the trifunctional silane compound represented by the general formula (3) include trialkoxysilanes such as methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, butyltrimethoxysilane, butyltriethoxysilane, hexyltrimethoxysilane, trifluoropropyltrimethoxysilane, and heptadecafluorodecyltrimethoxysilane, and of these, methyltrimethoxysilane, methyltriethoxysilane, ethyltrimethoxysilane and ethyltriethoxysilane are preferred, and methyltrimethoxysilane and methyltriethoxysilane are particularly desirable. Partial hydrolysis-condensation products of the above compounds may also be used.

The quantity added of the trifunctional silane compound represented by the general formula (3) is preferably within a range from 0.001 to 1 mol, and preferably from 0.01 to 0.1 mols, and even more preferably from 0.01 to 0.05 mols, per 1 mol of Si atoms within the hydrophilic spherical silica microparticles.

The concentration of the silica microparticles within the first hydrophobic spherical silica microparticles mixed solvent dispersion obtained in this step (A2) is typically at least 3% by mass but less than 15% by mass, and is preferably within a range from 5 to 10% by mass. Under conditions where this concentration is too low, the productivity tends to deteriorate, whereas if the concentration is too high, the silica microparticles tend to aggregate.

Next, in regard to the step (III), in the general formulas (4) and (5), $R^3$ is preferably a monovalent hydrocarbon group of 1 to 4 carbon atoms, and even more preferably a monovalent hydrocarbon group of 1 to 2 carbon atoms. Examples of the monovalent hydrocarbon group represented by $R^3$ include alkyl groups such as a methyl group, ethyl group, propyl group, isopropyl group and butyl group, preferred examples include a methyl group, ethyl group and propyl group, and particularly preferred examples include a methyl group and ethyl group. A portion of, or all of, the hydrogen atoms within these monovalent hydrocarbon groups may be substituted with a halogen atom such as a fluorine atom, chlorine atom or bromine atom, and preferably with a fluorine atom.

Examples of the hydrolyzable group represented by X include a chlorine atom, alkoxy group, amino group and acyloxy group, and of these, an alkoxy group or amino group is preferred, and an alkoxy group is particularly desirable.

Examples of the silazane compound represented by the general formula (4) include hexamethyldisilazane and hexaethyldisilazane, and of these, hexamethyldisilazane is preferred. Examples of the monofunctional silane compound represented by the general formula (5) include monosilanol compounds such as trimethylsilanol and triethylsilanol, monochlorosilanes such as trimethylchlorosilane and triethylchlorosilane, monoalkoxysilanes such as trimethylmethoxysilane and trimethylethoxysilane, monoaminosilanes such as trimethylsilyldimethylamine and trimethylsilyldiethylamine, and monoacyloxysilanes such as trimethylacetoxysilane. Of these, trimethylsilanol, trimethylmethoxysilane and trimethylsilyldiethylamine are preferred, and trimethylsilanol and trimethylmethoxysilane are particularly desirable.

The quantity used of these compounds is typically within a range from 0.1 to 0.5 mols, preferably from 0.2 to 0.4 mols, and even more preferably from 0.25 to 0.35 mols, per 1 mol of Si atoms within the hydrophilic spherical silica microparticles used.

In the step (II) of the above production method, the hydrophilic silica microparticles (the core particles) obtained in the step (I) are treated with a trifunctional silane compound of the general formula (3) or a partial hydrolysis-condensation product thereof. These hydrophilic silica microparticles that function as the core particles may be obtained by a method other than that described in the step (I), provided they meet the particle size range specified above, but are preferably synthesized by the hydrolysis-condensation (sol-gel method) of the aforementioned step (I). Microparticles prepared in this manner are also preferred in terms of facilitating control of the particle size, enabling synthesis of microparticles with a narrow particle size distribution, and ensuring a minimal quantity of coarse particles that may impair the coating film transparency.

The surface of the silica microparticles that represent the core particles may also be treated by a method that does not include the step (II), for example by treating the hydrophilic silica microparticles with a silazane compound represented by the general formula (4) and/or a monofunctional silane compound represented by the general formula (5), as in the step (III) above, thereby introducing $(R^3)_3SiO_{1/2}$ units at the surface of the silica microparticles.

In the general formulas (4) and (5), the $R^3$ groups represent identical or different, substituted or unsubstituted monovalent hydrocarbon groups of 1 to 20 carbon atoms. In those cases where weather resistance is of particular importance, a methyl group is preferred, whereas in order to impart the coating film surface with favorable water repellency, a fluorine-substituted alkyl group such as a trifluoromethyl group, γ-trifluoropropyl group or heptadecafluorodecyl group, or a fluorine-substituted polyether group such as a group containing a hexafluoropropylene ether structure is preferred.

In the step (III), the use of a silazane compound represented by the general formula (4) is generally preferred form the viewpoints of reactivity and the ease of conducting post-processing.

Prior to conducting the hydrophobization of the step (III), the step (II) is preferably performed, thereby treating the hydrophilic silica core microparticles with a trifunctional silane compound represented by the general formula (3), and partially hydrophobizing the surface of the microparticles.

Compared with the hydrophilic silica microparticles that function as the core particles, the silica microparticles that have been treated with the trifunctional silane compound exhibit an increased level of hydrophobicity, and therefore the dispersion medium can be replaced with an organic solvent. The dispersion medium prior to solvent replacement is a protic solvent such as water or methanol, which can react with the silazane compound used in the step (III). In order to ensure a more efficient trialkylsilylation by the silazane compound in the step (III), the dispersion medium is preferably replaced with an aprotic solvent. Examples of preferred aprotic solvents include ketone-based solvents such as methyl isobutyl ketone and cyclohexanone.

The hydrophobic silica microparticles of the component (B) may be used in the form of a dispersion, meaning the dispersion obtained in the above type of wet production method my be used without further modification, or alternatively, the dispersion may be dried to form a powder, which may then be re-dispersed within a different dispersion medium.

Examples of hydrophobic silica materials that are ideal for use in the present invention include the materials disclosed in Japanese Patent Publication No. 3,756,339 and Japanese Laid-open publication (kokai) No. 2005-15251.

In terms of the levels of abrasion resistance and adhesion obtained, the quantity of the component (B) added to the composition of the present invention is preferably within a range from 1 to 100 parts by mass, even more preferably from 3 to 80 parts by mass, and most preferably from 5 to 70 parts by mass, per 100 parts by mass of the resin (solid fraction) of the component (A). If the quantity of the component (B) is too small, then the level of abrasion resistance provided by the microparticles is inadequate, whereas if the quantity is too large, immobilization of the microparticles is unsatisfactory, which causes a deterioration in the abrasion resistance.

[Component (C)]

The component (C) may use a known curing catalyst that is typically used in coating compositions. Specifically, the component (C) is a curing catalyst that accelerates the condensation reaction of the condensation-reactive groups such as silanol groups or alkoxy groups contained within the silicone resin (A), and specific examples include basic compounds such as lithium hydroxide, sodium hydroxide, potassium hydroxide, sodium methylate, sodium propionate, potassium propionate, sodium acetate, potassium acetate, sodium formate, potassium formate, trimethylbenzylammonium hydroxide, tetramethylammonium hydroxide, n-hexylamine, tributylamine, diazabicycloundecene (DBU) and dicyandiamide; metal-containing compounds such as tetraisopropyl titanate, tetrabutyl titanate, titanium acetylacetonate, aluminum triisobutoxide, aluminum triisopropoxide, tris(acetylacetonate)aluminum, diisopropoxy(ethylacetoacetate)aluminum, aluminum perchlorate, aluminum chloride, cobalt octylate, cobalt acetylacetonate, iron acetylacetonate, tin acetylacetonate, dibutyltin octylate and dibutyltin laurate; and acidic compounds such as p-toluenesulfonic acid and trichloroacetic acid. Of these, sodium propionate, sodium acetate, sodium formate, trimethylbenzylammonium hydroxide, tetramethylammonium hydroxide, tris(acetylacetonate) aluminum and diisopropoxy(ethylacetoacetate)aluminum are particularly preferred.

Moreover, in order to ensure not only favorable curability and crack resistance, but also maintain favorable storage stability for the coating composition, a quaternary ammonium salt or phosphonium salt represented by a general formula (6) shown below may be used as the curing catalyst. This curing catalyst may also be used in combination with the conventional catalysts described above.

$$[(R^7)(R^8)(R^9)(R^{10})M]^+ \cdot X^- \qquad (6)$$

(wherein, $R^7$, $R^8$, $R^9$ and $R^{10}$ each represent an alkyl group of 1 to 18 carbon atoms, and preferably 1 to 12 carbon atoms, which may be substituted with one or more halogen atoms, M represents an ammonium ion or phosphonium ion, and $X^-$ represents a halogen anion, a hydroxide anion, or a carboxylate anion of 1 to 4 carbon atoms)

In the general formula (6), examples of the alkyl groups of 1 to 18 carbon atoms that may be substituted with a halogen atom, represented by $R^7$ through $R^{10}$, include alkyl groups such as a methyl group, ethyl group, propyl group, butyl group, pentyl group, hexyl group, heptyl group and octyl group; cycloalkyl groups such as a cyclopentyl group and cyclohexyl group; and halogen-substituted hydrocarbon groups such as a chloromethyl group, γ-chloropropyl group, and 3,3,3-trifluoropropyl group.

Furthermore, the anion $X^-$ is preferably a hydroxide anion or an acetate anion.

Specific examples of this type of catalyst include hydroxides such as tetra-n-propylammonium hydroxide, tetra-n-butylammonium hydroxide, tetra-n-pentylammonium hydroxide, tetra-n-hexylammonium hydroxide, tetracyclohexylammonium hydroxide, tetrakis(trifluoromethyl)ammonium hydroxide, trimethylcyclohexylammonium hydroxide, trimethyl(trifluoromethyl)ammonium hydroxide, trimethyl-t-butylammonium hydroxide, tetra-n-propylphosphonium hydroxide, tetra-n-butylphosphonium hydroxide, tetra-n-pentylphosphonium hydroxide, tetra-n-hexylphosphonium hydroxide, tetracyclohexylphosphonium hydroxide, tetrakis(trifluoromethyl)phosphonium hydroxide, trimethylcyclohexylphosphonium hydroxide, trimethyl(trifluoromethyl)phosphonium hydroxide and trimethyl-t-butylphosphonium hydroxide, and salts of these hydroxides with a halogen acid or a carboxylic acid of 1 to 4 carbon atoms. Of these, tetrapropylammonium hydroxide, tetrapropylammonium acetate, tetrabutylammonium hydroxide, tetrabutylammonium acetate, tetrabutylphosphonium hydroxide and tetrabutylphosphonium acetate are preferred. These catalysts may be used either alone, or in combinations of two or more different catalysts.

Although there are no particular restrictions on the blend quantity of the component (C), which need only be sufficient to ensure effective curing of the silicone resin of the component (A), specific examples of the blend quantity are within a range from 0.0001 to 30% by mass, and preferably from 0.001 to 10% by mass, relative to the mass of the silicone resin (solid fraction). If the blend quantity is too large, then the formed coating film becomes prone to cracking, and the water resistance of the film tends to deteriorate.

[Component (D)]

The component (D) is a solvent, and there are no particular restrictions on the nature of the solvent provided it is capable of dissolving the components (A) and (C), and dispersing but not dissolving the component (B). Of such solvents, those in which a high-polarity organic solvent is the main solvent are preferred. Specific examples of these polar organic solvents include alcohols such as methanol, ethanol, isopropyl alcohol, n-butanol, isobutanol, t-butanol and diacetone alcohol; ketones such as methyl propyl ketone, diethyl ketone, methyl isobutyl ketone, and cyclohexanone; ethers such as dipropyl ether, dibutyl ether, anisole, dioxane, ethylene glycol monoethyl ether, ethylene glycol monobutyl ether, propylene glycol monomethyl ether and propylene glycol monomethyl ether acetate; and esters such as ethyl acetate, propyl acetate, butyl acetate and cyclohexyl acetate. Any one of the above solvents, or a mixture comprising two or more different solvents may be used.

Particularly preferred solvents include methyl isobutyl ketone (MIBK), cyclohexanone, ethanol, isopropyl alcohol, isobutanol, t-butanol, diacetone alcohol, propylene glycol monomethyl ether and propylene glycol mono-n-propyl ether.

The quantity added of the component (D) is preferably sufficient to generate a solid fraction concentration for the coating composition of the present invention of 1 to 40% by mass, and particularly from 5 to 30% by mass. If the solid fraction concentration is outside this range, then problems may develop with the cured coating film. If the solid fraction concentration is too low, then the coating film becomes prone to sagging, uneven distribution or mottle, meaning the desired levels of hardness and abrasion resistance may be unattainable. In contrast, if the solid fraction concentration is too high, then the coating film may become prone to blushing, whitening or cracking.

[Other Components]

Other components besides the aforementioned components (A) through (D) may be added to the composition of the present invention as required, provided their addition does not impair the object and effects of the present invention. Examples of these other optional components include pH regulators, leveling agents, thickeners, pigments, dyes, metal oxide microparticles, metal powders, antioxidants, ultraviolet absorbers, ultraviolet stabilizers, heat-reflecting or heat-absorbing agents, flexibility-imparting agents, antistatic agents, anti-soiling agents, and water repellency-imparting agents. In particular, pH regulators are useful in improving the storage stability of the composition. In those cases where the substrate to be coated with the coating composition is composed of an organic resin or wood, the addition of an ultraviolet absorber and/or ultraviolet stabilizer can be effective in preventing yellowing or surface degradation of the substrate.

—pH Regulators

A pH regulator (hereafter also referred to as the component (E)) is added to ensure that the pH of the coating composition of the present invention, namely, the pH of the liquid that acts as the dispersion medium within the dispersion of the microparticles of the component (B), is maintained in a weakly acidic state. Because silanol groups exist at many of the molecular terminals of the silicone resin of the component (A), if the pH of the composition is strongly acidic or basic, then a condensation reaction tends to occur within the composition following preparation, causing the molecular weight to increase further, and in some cases, causing the composition to gel. Accordingly, a pH regulator is preferably added in order to maintain the pH of the liquid composition within a range from 2 to 7, and even more preferably from 2.5 to 6, thereby improving the storage stability.

Specific examples of the pH regulator include inorganic acids such as hydrochloric acid, nitric acid and phosphoric acid, organic acids such as methanesulfonic acid, formic acid, acetic acid, oxalic acid, propionic acid and citric acid, and basic compounds such as ammonia and ethylenediamine.

Without the addition of a pH regulator, factors such as the nature and quantity of the curing catalyst determine whether the pH of the composition is strongly acidic or basic, and consequently the pH regulator is preferably selected in accordance with these factors. For example, in those cases where a preferred quaternary ammonium salt or the like is used as the curing catalyst, an acidic compound such as acetic acid or citric acid is preferably added in a quantity that causes the pH of the composition to fall within the pH range described above.

Any conventional leveling agent may be used, provided it is a compound that dissolves in the coating composition. Specific examples of preferred leveling agents include polyether silicone-based compounds, fluoropolymer-based compounds, and mixtures thereof.

Known ultraviolet absorbers may be used, including inorganic and organic ultraviolet absorbers. Inorganic ultraviolet absorbers include, e.g., inorganic oxides such as zinc oxide, cerium oxide and zirconium oxide, metal chelate compounds of titanium, zinc and zirconium, as well as (partial) hydrolysis products or condensation products thereof. Examples of organic ultraviolet absorbers include derivatives of compounds in which the main backbone is a hydroxybenzophenone system, benzotriazole system, cyano acrylate system or triazine system. Moreover, polymers such as vinyl polymers that include one of these ultraviolet absorbers as a side chain, copolymers with other vinyl monomers, or silylated ultraviolet absorbers or (partial) hydrolysis-condensation products thereof may also be used.

Specific examples include 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-butylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3-diphenyl acrylate, 2-(2-hydroxy-4-hexyloxyphenyl)-4,6-diphenyltriazine, (co)polymers of 2-hydroxy-4-(2-acryloyloxyethoxy)benzophenone, (co)polymers of 2-(2'-hydroxy-5'-methacryloyloxyethylphenyl)-2H-benzotriazole, the reaction product of 2,4-dihydroxybenzophenone and γ-glycidoxypropyltrimethoxysilane, the reaction product of 2,2',4,4'-tetrahydroxybenzophenone and γ-glycidoxypropyltrimethoxysilane, and (partial) hydrolysis products of the above compounds. These organic-based ultraviolet absorbers may also be used in combinations containing two or more different compounds.

The blend quantity of the ultraviolet absorber is preferably within a range from 0.1 to 100% by mass relative to the coating composition solid fraction.

Examples of preferred ultraviolet stabilizers include compounds that contain one or more cyclic hindered amine structures within each molecule, exhibit favorable compatibility with the coating composition of the present invention, and also have low volatility. Specific examples of the ultraviolet stabilizers include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)pyrrolidine-2,5-dione, N-acetyl-3-dodecyl-1-(2,2,6,6-tetramethyl-4-piperidinyl)pyrrolidine-2,5-dione, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, a condensation product of 1,2,3,4-butanetetracarboxylic acid with 2,2,6,6-tetramethylpiperidinol and tridecanol, 8-acetyl-3-dodecyl-7,7,9,9-tetramethyl-1,3,8-triazaspiro[4,5]decane-2,4-dione, a condensation product of 1,2,3,4-butanetetracarboxylic acid with 1,2,2,6,6-pentamethyl-4-piperidinol and β, β, β, β'-tetramethyl-3,9-(2,4,8,10-tetraoxaspiro[5,5]undecane)diethanol, and a condensation product of 1,2,3,4-butanetetracarboxylic acid with 1,2,2,6,6-pentamethyl-4-piperidinol and β, β, β, β'-tetramethyl-3,9-(2,4,8,10-tetraoxaspiro[5,5]undecane)diethanol. Furthermore, in order to enable immobilization of the ultraviolet stabilizer, silyl-modified ultraviolet stabilizers such as those disclosed in Japanese Post-Examination Patent publication (kokoku) No. Sho 61-56187 may be added, including 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino-4-propylmethyldiethoxysilane, and (partial) hydrolysis products of the above compounds. These ultraviolet stabilizers may also be used in combinations containing two or more different compounds.

The blend quantity of the ultraviolet light stabilizer is preferably within a range from 0.01 to 10% by mass relative to the coating composition solid fraction.

The composition of the present invention can be prepared by using a conventional method to mix together the prescribed quantities of the components (A) through (D) and any optional components that are required. During this mixing, the solubility of the silicone resin of the component (A) must be maintained, and the dispersion stability of the hydrophobic silica microparticles of the component (B) must also be maintained. Unlike hydrophilic silica materials, the hydrophobic silica microparticles of the component (B) are difficult to disperse within water, which has a high polarity. As the water content of the composition increases, the dispersibility of the silica microparticles deteriorates, causing precipitation. Accordingly, the water content within the composition is preferably not more than 10% by mass, and is even more preferably 8% by mass or less. The water content within the composition at this point can be measured using the Karl Fischer method.

[Uses]

The coating composition of the present invention can be used for producing a coated item, by applying the composition to at least a portion of the surface of a substrate, either directly or with one or more other layers disposed therebetween, and then curing the composition to form a coating film.

The composition may be applied to the substrate using any conventional coating method, which may be selected from coating methods such as brushing, spraying, immersion, flow coating, roll coating, curtain coating, spin coating or knife coating.

In those cases where the coating film is formed on the substrate with one or more other layers disposed therebetween, an example of this other layer is a primer layer, which is formed for the purpose of improving the adhesion of the coating film to the substrate.

There are no particular restrictions on the substrates that can be used, and there are also no particular restrictions on the substrate shape, although sheet-like and film-like substrates are typical. Examples of the substrate material include plastic moldings, timber-based products, ceramics, glass, metals, or composite products thereof. The composition of the present invention is particularly suited to use with various plastic materials (namely, organic resin substrates), and of these, polycarbonates, polystyrenes, acrylic resins, modified acrylic resins, urethane resins, thiourethane resins, polycondensation products of a halogenated bisphenol A and ethylene glycol, acrylic urethane resins, halogenated aryl group-containing acrylic resins, and sulfur-containing resins are particularly preferred. Resin substrates that have undergone a surface treatment such as a chemical conversion treatment, corona discharge treatment, plasma treatment or treatment with an acid or alkali, and laminates in which the surface layer is formed from a different resin from the substrate body may also be used. Specific examples of laminates include laminates comprising a polycarbonate resin substrate with a surface layer composed of an acrylic resin or urethane resin, and laminates comprising a polyester resin substrate with a surface layer composed of an acrylic resin, which can be produced by co-extrusion or lamination methods.

In the present invention, particularly in those cases where a plastic molding is used as the substrate, a primer layer is preferably provided to improve the adhesion with the substrate. The primer is preferably an organic resin such as an acrylic resin, vinyl-based resin, epoxy resin, polyurethane-based resin or polyester-based resin, and from the viewpoints of weather resistance and durability, an acrylic resin or vinyl-based resin is particularly desirable.

The method of forming the coating film preferably comprises the steps described below. Namely, the method preferably comprises the steps of (1) applying a conventional primer to the substrate as a first layer, (2) curing the applied primer layer by air drying or heat curing, (3) applying the coating composition of the present invention to the surface of the cured primer layer, and (4) drying the composition at room temperature or heating the composition to form a coating layer as a second layer. Examples of materials that may be used as the primer in this method include the materials disclosed in Japanese Laid-open publication (kokai) No. Sho 56-92059 and Japanese Laid-open publication (kokai) No. Hei 1-149878, polymers of an acrylic-based and/or vinyl-based monomer, copolymers of an acrylic-based and/or vinyl-based monomer with an alkoxysilyl group-containing acrylic monomer, and copolymers of an acrylic-based and/or vinyl-based monomer with an ultraviolet-absorbing vinyl-based monomer.

The coating film may be cured by standing in the open air, by air drying, or by heating. Although there are no particular restrictions on the curing temperature and the curing time, heating is preferably conducted at a temperature not higher than the heat-resistant temperature of the substrate, for a period of 10 minutes to 2 hours. Specifically, heating at a temperature within a range from 80 to 135° C. for a period of 30 minutes to 2 hours is particularly preferred.

Although there are no particular restrictions on the thickness of the coating film formed on top of the substrate, the thickness of the coating layer composed of the coating composition of the present invention is preferably within a range from 0.1 to 100 µm, and is even more preferably from 1 to 50 µm. In those cases where a primer layer is used, the thickness of the primer layer is preferably within a range from 0.01 to 100 µm, and is even more preferably from 0.1 to 50 µm.

EXAMPLES

A description of specifics of the present invention is provided below based on a series of examples and comparative examples, but the present invention is in no way limited by the examples presented below. In the following examples, unless stated otherwise, "%" refers to "% by mass". The weight average molecular weight values are polystyrene-referenced values measured by GPC using THF as the solvent. In the following description, a star symbol (*) appended to the label for a silicone resin or silica microparticles indicates a comparative example or reference example that does not conform to the conditions of the present invention.

<Production of Silicone Resins of Component (A)>

Production Example 1

A 2-liter flask fitted with a stirrer, a cooling tube and a thermometer was charged with 250 g of methyltrimethoxysilane, and a hydrolysis was conducted by adding 250 g of a 0.01 N aqueous solution of hydrochloric acid under constant stirring. Subsequently, the temperature was raised to 65 to 75° C., and the generated methanol was removed by evaporation, while the siloxane product of the hydrolysis was subjected to a polycondensation over a period of two hours, thereby increasing the molecular weight of the product. Additional methanol was then removed by further heating, and at the point where the siloxane became insoluble in the water, generating a cloudiness within the system, 200 g of cyclohexanone was added. Subsequently, the removal of methanol by evaporation was continued, the internal temperature was raised to 92° C., and once substantially all of the methanol had been removed, the heating was halted, and the reaction mixture was left to stand and cool. The reaction mixture separated into a lower cyclohexanone solution layer and an upper water layer, and the lower layer was extracted. This lower layer was diluted with 321 g of isopropyl alcohol (hereafter abbreviated as IPA), and the solution was then filtered through a filter paper, yielding 635 g of a silicone resin solution (A1) with a solid fraction concentration of 19.6%. The weight average molecular weight of the thus obtained silicone resin was $3.3 \times 10^3$.

Production Example 2

With the exceptions of altering the polycondensation temperature to 65 to 85° C., and altering the reaction time to 4 hours, a silicone resin solution (A2) with a solid fraction concentration of 20.6% was obtained in the same manner as the production example 1. The weight average molecular weight of this resin was $8.5 \times 10^3$.

Production Example 3

A 2-liter flask fitted with a stirrer, a cooling tube and a thermometer was charged with 214 g of methyltrimethoxysilane and 36 g of Silicate 35 (a partial hydrolysis-condensation product of tetraethoxysilane, on average a dimer, manufactured by Tama Chemicals Co., Ltd.), and the mixture was stirred thoroughly. The resulting mixture was subjected to a hydrolysis reaction by adding 250 g of a 0.01 N aqueous solution of hydrochloric acid under constant stirring. The process from the subsequent removal of methanol through to the separation of the reaction mixture into two layers and the extraction of the lower siloxane layer was conducted in the same manner as the production example 1. The extracted lower layer was then diluted with 321 g of IPA, and the solution was filtered through a filter paper, yielding 626 g of a silicone resin solution (A3) with a solid fraction concentration of 19.6%. The weight average molecular weight of the thus obtained silicone resin was $3.4 \times 10^3$.

Production Example 4

A 2-liter flask fitted with a thermometer, a stirrer and a cooling tube was charged with 408 g of methyltrimethoxysilane and 400 g of toluene, 11 g of 98% methanesulfonic acid was added as a catalyst, and with the internal temperature maintained at 30° C. or lower, 146 g of water was added dropwise to the flask, thereby hydrolyzing the methyltrimethoxysilane. Following completion of the dropwise addition, the reaction was completed by stirring for a further 2 hours at room temperature. Subsequently, the acidic component was neutralized with a basic compound, and the generated methanol was removed by evaporation. The neutralized salt was removed completely by washing twice with water, and the solvent components such as toluene were then removed under reduced pressure at 105° C. over a period of 3 hours, thereby reducing the volatile fraction to 1.1% and yielding 210 g of a silicone resin in the form of a colorless, transparent solid. This solid was re-dissolved in sufficient IPA to generate a solution with a solid fraction concentration of 18% by mass, thus forming a silicone resin solution (A4). The weight average molecular weight of this resin was $7.5 \times 10^3$.

Production Example 5

A 5-liter flask fitted with a thermometer, a stirrer and a cooling tube was charged with 1,360 g of methyltrimethoxysilane and 381 g of isobutanol, and with the temperature maintained at 10° C. or lower by using ice cooling, a hydrolysis was conducted by adding 1,350 g of a water-dispersed colloidal silica sol (Snowtex-O, manufactured by Nissan Chemical Industries, Ltd., silica solid fraction: 20%). Because the water-dispersed silica sol was acidic, a catalyst was not used. After stirring for 3 hours, the ice cooling was stopped, and stirring was continued for a further 10 hours while the reaction system was returned to room temperature. Subsequently, 669 g of propylene glycol monomethyl ether was added as a diluting solvent, yielding a coating composition dispersion (A5*) (solid fraction concentration: 25%). The weight average molecular weight of this resin, determined by GPC, was $8.9 \times 10^2$.

Production Example 6

A one liter flask fitted with a thermometer, a stirrer and a cooling tube was charged with 268 g of methyltrimethoxysilane, and a hydrolysis was conducted by adding, at room temperature, 78 g of the same water-dispersed colloidal silica as that used in the production example 5, and 182 g of a 0.2 N aqueous solution of acetic acid. Following completion of the dropwise addition, the reaction mixture was stirred at 60° C. for 3 hours to complete the hydrolysis and also effect a polycondensation. Subsequently, 238 g of cyclohexanone was added, and the methanol generated by the hydrolysis was removed by evaporation at normal pressure, by raising the temperature to 95° C. 317 g of t-butanol as a diluent, and 0.05 g of a leveling agent KP-341 (manufactured by Shin-Etsu Chemical Co., Ltd.) were then added, and the reaction mixture was filtered though a filter paper, yielding a colorless and transparent silicone resin solution (A6*) with a solid fraction concentration of 17.5%. The weight average molecular weight of this resin, determined by GPC, was $1.8 \times 10^3$.

<Production of Hydrophobic Silica of the Component (B)>

Production Example 7

A 3-liter flask fitted with a stirrer, a cooling tube and a thermometer was charged with 623.7 g of methanol, 41.4 g of water and 49.8 g of 28% ammonia water, and the mixture was stirred thoroughly. The temperature of the resulting solution was adjusted to 35° C., and with the solution undergoing constant stirring, dropwise addition of 1,163.7 g of tetramethoxysilane and 418.1 g of 5.4% ammonia water were commenced simultaneously, with the former being added dropwise over a period of 6 hours and the latter added dropwise over a period of 4 hours. Following completion of the dropwise addition of the tetramethoxysilane, stirring was continued for a further 0.5 hours to complete the hydrolysis, thereby yielding a suspension of silica microparticles. Subsequently, an ester adapter and a cooling tube were fitted to the reaction vessel, the suspension was heated to a temperature of 60 to 70° C., and once 649 g of methanol had been removed by evaporation, 1,600 g of water was added. The mixture was then heated to a temperature of 70 to 90° C., and a further 160 g of methanol was removed by evaporation, yielding a silica microparticles aqueous suspension (this dispersion, with a solid fraction concentration of 15%, is used as a dispersion (B4*) in a comparative example 4 described below). 11.6 g of methyltrimethoxysilane was then added dropwise to the aqueous suspension at room temperature over a period of 30 minutes, and following completion of the dropwise addition, stirring was continued for a further 12 hours to complete the surface treatment of the silica microparticles. To the thus obtained dispersion was added 1,000 g of methyl isobutyl ketone, and the mixture was then heated to a temperature of 80 to 110° C., and 1,336 g of a mixture of methanol and water was removed by evaporation over a period of 11 hours. 357.6 g of hexamethyldisilazane was added at room temperature to the resulting dispersion, and the mixture was then heated to a temperature of 120° C. and reacted for 3 hours, thereby subjecting the silica microparticles to a trimethylsilylation. Subsequently, the solvent was removed by evaporation under reduced pressure, yielding 477 g of a hydrophobic surface-treated silica (B1). This silica was used to form a 20% IPA dispersion. The average particle size (D50) of the dispersion was 124 nm.

Production Example 8

With the exception of altering the hydrolysis temperature to 20° C., a hydrophobic surface treated silica (B2) was obtained under the same synthesis conditions as those described for the production example 7. This silica was used to form a 20% IPA dispersion. The average particle size (D50) of the dispersion was 296 nm.

Examples 1 to 7

Using the silicone resin solutions (A1) to (A4) as the component (A),

20% dispersions of the hydrophobic silica materials (B1) and (B2) as the component (B), tetrabutylammonium hydroxide (TBAH: as a 2.5% IPA solution) as the component (C), and acetic acid (as a 2.5% IPA solution) as the component (E), coating compositions of each of the examples were prepared by blending the components in the formulations shown in Table 1. These coating compositions were each applied to a substrate and cured to form a coating film, which was then subjected to a variety of tests and evaluations.

Comparative Example 1

A composition was prepared without adding the hydrophobic silica of the component (B).

Comparative Examples 2 and 3

Instead of using a component (B), the water-dispersed colloidal silica sol used as a raw material in the production examples 5 and 6 (Snowtex-O, manufactured by Nissan Chemical Industries, Ltd., silica solid fraction: 20%) (hereafter referred to as the component (B3*)) was used to prepare a composition.

Comparative Example 4

The aqueous silica dispersion (B4*) formed prior to the hydrophobic treatment in the production example 7 was used to prepare a composition.

[Liquid Water Content]

The water content in the coating composition of each of the above examples was measured by the Karl Fischer method, using an Aquacounter AQV-2100 manufactured by Hiranuma Sangyo Corporation.

[Method of Preparing Evaluation Samples]

Using a flow coating method, a primer composition (product name: Primer PC-7A, manufactured by Shin-Etsu Chemical Co., Ltd.) was applied to a polycarbonate sheet of thickness 0.5 mm, in sufficient quantity to form a primer film thickness of 2 to 5 μm, and the primer composition was then cured by air drying for 15 minutes, and then heating at 120° C. for 30 minutes. For each coating composition, a flow coating method was then used to apply the coating composition to the surface of the primer coating film, in sufficient quantity to form a coating film thickness of 2 to 5 μm, and curing was then conducted by air drying for 15 minutes, and then heating at 130° C. for one hour, thereby forming a coating film and completing preparation of the evaluation sample.

[Evaluation and Testing Methods]

<<Abrasion Resistance>>

In accordance with ASTM 1044, abrasion wheels CS-10F were fitted to a taber abrasion testing apparatus, and the evaluation sample was spun through 500 revolutions with an applied load of 500 g. The haze of the sample was measured before and after testing, and the change in the haze (ΔH) was determined. The abrasion resistance was evaluated based on the following criteria.

ΔH≦5.0: the abrasion resistance is favorable, recorded as ◯

5.0<ΔH<10.0: the abrasion resistance is poor, recorded as Δ

10.0≦ΔH: the abrasion resistance is very poor, recorded as ×

<<Adhesion>>

In accordance with JIS K5400, a razor blade was used to insert 6 lengthwise and 6 crosswise cuts at 2 mm intervals within the coating film, thereby forming 25 squares. A cellophane tape (brand name: sellotape, manufactured by Nichiban Co., Ltd.) was bonded to the squares, and a corner of the cellophane tape was then grasped, and pulled rapidly away from the coating film at an angle of 90°. The number of squares (X) of the coating film that were retained and not peeled off with the cellophane tape was recorded, using the format X/25.

<<Weather Resistance Evaluation>>

Using an Eye Super UV Tester W-151 manufactured by Iwasaki Electric Co., Ltd., and setting a single cycle as [5 hours under conditions including: black panel temperature: 63° C., humidity: 50% RH, illumination 50 mW/cm$^2$, rainfall: 10 seconds/hour]→[1 hour under conditions including: black panel temperature: 30° C., humidity: 95% RH], the evaluation sample was subjected to 100 cycles. The coating film was then inspected visually, and under a microscope (magnification: 250×) in those cases where nothing was discernible with the naked eye, for the presence of cracking, and the weather and crack resistance of the coating film was evaluated using the following criteria.

◯: No anomalies

Δ: Minor cracking

×: Cracking across the entire coating film

TABLE 1

| Component | | Example 1 | Example 2 | Example 3 | Example 4 | Example 5 | Example 6 | Example 7 |
|---|---|---|---|---|---|---|---|---|
| (A) (Solution) | A1 | 90 | 80 | 70 | 60 | — | — | — |
| | A2 | — | — | — | — | 80 | 70 | — |
| | A3 | — | — | — | — | — | — | 80 |
| | A4 | 50 | 50 | 50 | 50 | 25 | 25 | 50 |
| (B) (Dispersion) | B1 | 10 | 20 | 30 | 40 | — | — | — |
| | B2 | — | — | — | — | 20 | 30 | 20 |
| | B4* | — | — | — | — | — | — | — |
| (A) + (B3*) | A5 | — | — | — | — | — | — | — |
| | A6 | — | — | — | — | — | — | — |
| (C) | TBAH 2.5% solution | 1.2 | 1.2 | 1.2 | 1.2 | 1.2 | 1.2 | 1.2 |
| (E) | Acetic acid 2.5% solution | 1.8 | 1.8 | 1.8 | 1.8 | 1.8 | 1.8 | 1.8 |
| Water content [%] | | 3.7 | 3.3 | 2.9 | 2.5 | 2.8 | 2.3 | 3.8 |
| Abrasion resistance | | ◯ | ◯ | ◯ | ◯ | ◯ | ◯ | ◯ |
| Adhesion | | 25/25 | 25/25 | 25/25 | 25/25 | 25/25 | 25/25 | 25/25 |
| Weather and crack resistance | | ◯ | ◯ | ◯ | ◯ | ◯ | ◯ | ◯ |

TABLE 2

| Component | | Comparative example 1 | Comparative example 2 | Comparative example 3 | Comparative example 4 |
|---|---|---|---|---|---|
| (A) (Solution) | A1 | 100 | — | — | 80 |
| | A2 | — | — | — | — |
| | A3 | — | — | — | — |
| | A4 | 50 | — | — | 50 |
| (B) (Dispersion) | B1 | — | — | — | — |
| | B2 | — | — | — | — |
| | B4* | — | — | — | 20 |
| (A) + (B3*) | A5 | — | 100 | — | — |
| | A6 | — | — | 100 | — |
| (C) | TBAH 2.5% solution | 1.2 | 1.2 | 1.2 | 1.2 |
| (E) | Acetic acid 2.5% solution | 1.8 | — | — | 1.8 |

TABLE 2-continued

| Component | Comparative example 1 | Comparative example 2 | Comparative example 3 | Comparative example 4 |
|---|---|---|---|---|
| Water content [%] | 4.0 | >10 | >10 | Precipitation (coating impossible) |
| Abrasion resistance | X | ◯ | ◯ | |
| Adhesion | 25/25 | 25/25 | 25/25 | |
| Weather and crack resistance | Δ | X | X | |

What is claimed is:

1. A composition comprising:
   (A) a silicone resin obtained by hydrolysis and condensation of at least one compound selected from the group consisting of alkoxysilanes represented by a general formula (1) shown below and partial hydrolysis-condensation products thereof:

$$(R^1)_m Si(OR^2)_{4-m} \qquad (1)$$

wherein, $R^1$ represents a hydrogen atom, or a substituted or unsubstituted monovalent hydrocarbon group, $R^2$ represents an alkyl group of 1 to 3 carbon atoms, and m represents either 0 or 1, or
   a silicone resin obtained by hydrolysis and condensation of at least one material selected from the group consisting of combinations of an alkoxysilane represented by the above general formula (1) and a dialkoxysilane represented by a general formula (2) shown below:

$$(R^1)_2 Si(OR^2)_2 \qquad (2)$$

wherein, $R^1$ and $R^2$ are as defined above, and partial hydrolysis-condensation products of the combinations,
   (B) hydrophobic silica microparticles,
   (C) a curing catalyst, and
   (D) a solvent,
   wherein
   the silica microparticles of the component (B) are produced via steps described below:
   (I) a step of subjecting a tetrafunctional silane compound represented by $Si(OR^4)_4$, wherein $R^4$ represents identical or different monovalent hydrocarbon groups of 1 to 6 carbon atoms; or a partial hydrolysis-condensation product thereof; or a mixture thereof; to hydrolysis and condensation within a mixed liquid of a hydrophilic organic solvent and water that comprises a basic substance, thereby forming a silica microparticles dispersion,
   (II) a step of adding a trifunctional silane compound represented by a general formula (3) shown below:

$$R^5 Si(OR^6)_3 \qquad (3)$$

wherein, $R^5$ represents a substituted or unsubstituted hydrocarbon group of 1 to 20 carbon atoms, and $R^6$ represents identical or different monovalent hydrocarbon groups of 1 to 6 carbon atoms; or a partial hydrolysis-condensation product thereof; or a mixture thereof; to the silica microparticles dispersion, thereby treating a surface of the silica microparticles, introducing $R^5 SiO_{3/2}$ units at a surface of the silica microparticles, and yielding a treated silica dispersion, and (III) a step of adding a silazane compound represented by a general formula (4):

$$(R^3)_3 SiNHSi(R^3)_3 \qquad (4)$$

or a monofunctional silane compound represented by a general formula (5):

$$(R^3)_3 SiX \qquad (5)$$

wherein $R^3$ represents identical or different, substituted or unsubstituted monovalent hydrocarbon groups of 1 to 20 carbon atoms, and X represents an OH group or a hydrolysable group; or a mixture thereof; to the treated silica dispersion, thereby treating a surface of the silica microparticles, and introducing $(R^3)_3 SiO_{1/2}$ units at a surface of the silica microparticles.

2. The composition according to claim 1, wherein the component (B) is silica microparticles having $(R^3)_3 SiO_{1/2}$ units, wherein, $R^3$ represents identical, substituted or unsubstituted monovalent hydrocarbon groups of 1 to 20 carbon atoms at a surface of the microparticles.

3. The composition according to claim 1, wherein a particle size of the component (B), reported as a 50% volume average particle size, is within a range from 30 to 500 nm.

4. The composition according to claim 1, wherein a quantity of the hydrophobic silica microparticles of the component (B) is within a range from 1 to 100 parts by mass per 100 parts by mass of the silicone resin of the component (A).

5. The composition according to claim 1, wherein the component (C) is a quaternary ammonium salt.

6. The composition according to claim 1, wherein a weight average molecular weight of the silicone resin of the component (A), measured by gel permeation chromatography, and referenced against polystyrene standards, is at least 2,000 but not more than 50,000.

7. The composition according to claim 1, further comprising water, wherein a water content within the composition, measured using the Karl Fischer method, is a positive amount of not more than 10% by mass, based on the total mass of the composition.

8. The composition of claim 1, wherein $R^1$ in the formulas (1) and (2) is an alkyl group.

9. The composition of claim 1, wherein $R^1$ in the formulas (1) and (2) is a methyl group.

10. A coated item, comprising a substrate, and a cured coating film of the composition of claim 1 that is formed on at least a portion of a surface of the substrate surface, either directly or with one or more other layers disposed therebetween.

* * * * *